(12) United States Patent
Le et al.

(10) Patent No.: US 10,735,567 B2
(45) Date of Patent: Aug. 4, 2020

(54) MOBILE DEVICE

(71) Applicant: ams International AG, Rapperswil (CH)

(72) Inventors: Kim Phan Le, Eindhoven (NL); Martin Valkenburg, Naarden (NL); Christophe Marc Macours, Eindhoven (NL); Zoran Zivkovic, Hertogenbosch (NL)

(73) Assignee: ams International AG, Rapperswil (CH)

( * ) Notice: Subject to any disclaimer, the term of this patent is extended or adjusted under 35 U.S.C. 154(b) by 0 days.

(21) Appl. No.: 15/563,529

(22) PCT Filed: Mar. 31, 2016

(86) PCT No.: PCT/EP2016/057122
§ 371 (c)(1),
(2) Date: Sep. 29, 2017

(87) PCT Pub. No.: WO2016/156523
PCT Pub. Date: Oct. 6, 2016

(65) Prior Publication Data
US 2018/0109658 A1   Apr. 19, 2018

(30) Foreign Application Priority Data

Mar. 31, 2015 (EP) .................... 15162011

(51) Int. Cl.
| H04M 1/02 | (2006.01) |
| H04R 1/02 | (2006.01) |
| H04M 1/03 | (2006.01) |
| H04R 1/28 | (2006.01) |
| H04R 3/00 | (2006.01) |

(52) U.S. Cl.
CPC ............. *H04M 1/026* (2013.01); *H04M 1/03* (2013.01); *H04R 1/028* (2013.01); *H04R 1/2811* (2013.01); *H04R 3/00* (2013.01); *H04M 2250/12* (2013.01); *H04R 2499/11* (2013.01)

(58) Field of Classification Search
CPC .... H04M 1/026; H04M 1/03; H04M 2250/12; H04R 3/00; H04R 1/2811; H04R 1/028; H04R 2499/11
USPC ...................................... 455/575.1
See application file for complete search history.

(56) References Cited

U.S. PATENT DOCUMENTS

| 2007/0104532 | A1* | 5/2007 | Gallagher | B26D 1/045 401/195 |
| 2012/0099261 | A1* | 4/2012 | Reber | G06F 1/1632 361/679.3 |
| 2014/0098163 | A1* | 4/2014 | Reinten | B41J 2/14233 347/47 |
| 2014/0112510 | A1 | 4/2014 | Yang et al. | |

FOREIGN PATENT DOCUMENTS

| GB | 2322500 A | 8/1998 |
| WO | 2012114158 A1 | 8/2012 |

\* cited by examiner

*Primary Examiner* — Eugene Yun
(74) *Attorney, Agent, or Firm* — Fish & Richardson P.C.

(57) ABSTRACT

A mobile device comprising an environmental sensor and an electrically actuated membrane is described. The electrically actuated membrane may increase the airflow over the environmental sensor which may improve the response of the sensor to changes in the ambient environment around the mobile device.

17 Claims, 4 Drawing Sheets

MOBILE DEVICE

BACKGROUND OF THE INVENTION

The present disclosure relates to a mobile device and environmental sensing in a mobile device.

Recent generations of smartphones include accelerometers, gyroscopes, compass, pressure sensor, a light sensor, a temperature sensor, and humidity sensors. Some sensors are used to help improve user-input interfacing, some are used for navigation, and others are used to increase people's awareness about the surrounding environment such as temperature and humidity.

SUMMARY OF THE INVENTION

Various aspects are defined in the accompanying claims. In a first aspect there is defined a mobile device comprising: a housing, an electrically actuated membrane and an environmental sensor arranged at least partially within the housing, and a controller coupled to the electrically actuated membrane and the environmental sensor, wherein the environmental sensor is arranged to output a signal indicative of an environmental parameter, and the controller is operable to actuate the electrically actuated membrane to increase the airflow across a surface of the environmental sensor.

The mobile device may be able to reliably detect changes in the ambient environment with a reduced response time, as the actuation of the membrane may cause a relative increase in air flow over the environmental sensor compared to the air flow without the actuation. Mobile devices such as a mobile phone with a sensor may have a long response time of over 30 minutes to changes in ambient conditions.

Examples of an electrically actuated membrane may include a pressure sensor membrane or diaphragm, a speaker membrane or diaphragm or speaker cone, a microphone membrane or diaphragm, a piezo electric material or any component which deforms or deflects in response to an electric current being applied either directly or indirectly.

In embodiments the mobile device may comprise a loudspeaker with a speaker membrane and wherein the electrically actuated membrane comprises the speaker membrane.

A mobile device may already have a loudspeaker which may be actuated to increase the air flow in the vicinity of the loudspeaker. The environmental sensor may be located in the vicinity of the loudspeaker so that the air flow is increased over the surface of the sensor. The environmental sensor may be located at a distance of less than 2 centimeters from the loudspeaker. The air in the vicinity of the sensor may be refreshed so that it may equalized to the conditions of the ambient environment more rapidly than would otherwise be the case. Consequently the environmental sensor may be able to respond to changes in the ambient environment more rapidly because of the increased air flow.

In embodiments the speaker membrane and a portion of the housing may define a back volume of the loudspeaker and wherein the portion of the housing comprises a vent channel.

In embodiments the environmental sensor may be arranged at least partially within the back volume.

In embodiments the environmental sensor may be arranged at least partially within the vent channel.

The back volume of the loudspeaker may be coupled to the ambient environment via a vent channel which may be a duct in the housing.

In embodiments of the mobile device including a loudspeaker, the vent channel and the loudspeaker back volume may be dimensioned such that the resonant frequency of the vent channel is less than 30 Hz.

In embodiments of the mobile device including a loudspeaker the controller may be configured to actuate the loudspeaker at a frequency within 10% of the resonant frequency of the back volume vent channel.

When operating the speaker as an air pump, if the speaker is driven with a signal at or close to the resonant frequency of the back volume vent channel, the air flow may be improved since the air velocity will be greatest at the resonant frequency. By having a resonant frequency less than 30 Hz, inaudible frequencies may be used.

In embodiments of the mobile device including a loudspeaker, the loudspeaker may comprise a speaker module comprising a speaker module housing; wherein the speaker membrane is arranged within the speaker module housing and the environmental sensor is arranged at least partially within the speaker module housing.

In embodiments, the mobile device may comprise a microphone, the microphone comprising a microphone membrane and the electrically actuated membrane comprising the microphone membrane, and wherein the controller is operable either to receive a signal generated by the microphone in response to an acoustic input or to actuate the electrically actuated membrane to increase the airflow across a surface of the environmental sensor.

The environmental sensor may be located in the microphone compartment which may be coupled to the ambient environment via an aperture. By actuating the microphone when not being used in normal operation, the air flow over the environment sensor may be increased, which may improve the response time of the environmental sensor to changes in the ambient environment.

In embodiments the mobile device may comprise a pressure sensor, the pressure sensor comprising a pressure sensor membrane and the electrically actuated membrane comprising the pressure sensor membrane, and wherein in a first mode of operation the controller is operable either to receive a signal generated by the pressure sensor in response to a change in pressure or to actuate the electrically actuated membrane to increase the airflow across a surface of the environmental sensor.

In embodiments the controller may be configured to actuate the electrically actuated membrane at an inaudible frequency.

Frequencies of less than 30 hertz may be used, more typically frequencies of less than 10 Hz may be used as these frequencies are inaudible to user of the mobile device.

In embodiments the mobile device may comprise an integrated circuit comprising the controller and the environmental sensor.

In embodiments the controller is operable to determine a value of an environmental parameter from the environmental sensor.

In embodiments the environmental sensor may comprise at least one of a temperature sensor, a humidity sensor, and a gas sensor.

Embodiments of the mobile device may include a mobile phone, a personal digital assistant, a tablet computer, and an MP3 player.

BRIEF DESCRIPTION OF THE DRAWINGS

In the figures and description like reference numerals refer to like features. Embodiments are now described in detail, by way of example only, illustrated by the accompanying drawings in which.

DETAILED DESCRIPTION

Figure 1:
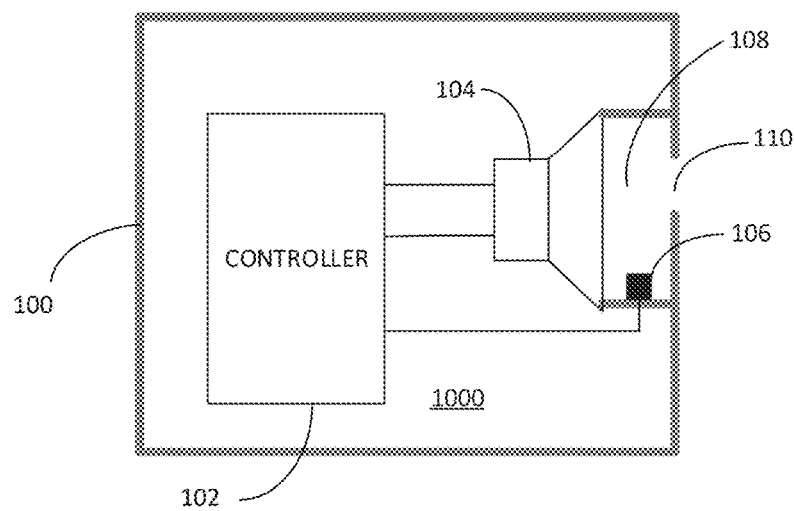
FIG. 1 shows a mobile device with an environment sensor according to an embodiment.

FIG. 1 shows a mobile device 1000 incorporating an environmental sensor. A controller 102 may have an output connected to a speaker 104. The controller 102 and the speaker 104 may be enclosed in a housing 100. The housing 100 may be for example the case of the mobile device, or may be a speaker module enclosure for the speaker 104. The speaker 104 may transmit the acoustic output through an audio output aperture 110 in the housing 100. An environmental sensor 106, which may be a temperature sensor, a humidity sensor, or a gas sensor, may be located in a speaker output enclosure 108. The speaker output enclosure 108 may be formed between the speaker 104 and the audio output aperture 110 by the housing 100. The environmental sensor 106 may be connected to the controller 102. In normal audio operation of the mobile device 1000, the controller 102 may output an audio signal to the loudspeaker 104. The loudspeaker 104 may then transmit the audio signal through the audio output aperture 110 by actuating the speaker membrane (not shown). To determine an environmental parameter such as temperature, relative humidity, or the concentration of a gas such as carbon dioxide (CO2), carbon monoxide (CO), or volatile organic compounds (VOC), the controller actuates the speaker 104 at a low frequency which may be below the audible range. The action of the speaker 104 may circulate the air in the speaker enclosure 108 and so may be considered to be operating as an air pump which may increase the airflow across a surface of the environmental sensor 106. The value of the environmental parameter to be measured may be detected by the environmental sensor 106. The controller 102 may convert a signal received from the environmental sensor 106, to a value representative of an environmental parameter. The speaker 104 may reduce the time to equalize the concentration of gases, the humidity, and the temperature of the air in the speaker enclosure 108 with the ambient air outside the mobile device.

Consequently the mobile device 1000 may be able to reliably detect changes in the ambient environment with a reduced response time, as mobile devices such as a mobile phone with a sensor may have a long response time to changes in ambient conditions. The slow response time of temperature sensors, due to the large thermal mass of the entire system, and humidity sensors, due to diffusion of moisture and absorption/desorption effects inside the phone, may limit their application. For instance, when one brings a phone from indoors at temperature of 21 degrees centigrade and relative humidity (RH) of 40% to outdoors at a temperature of 5 degrees C., and RH=80%, it may take more than 30 minutes for temperature and more than 40 minutes for RH to reach equilibrium between the phone and the ambient atmosphere.

Mobile devices with sensors may improve the response time of sensors by using algorithms to compensate for the thermal mass of the mobile device. However, this may not work reliably for example for sensing humidity RH due to the long time constant. The sensor may be exposed to all components inside the phone, such as printed circuit boards, and consequently the sensor observes all absorption and desorption of the whole system, which makes the response time much longer than that of a stand-alone sensor.

During the sensing mode of operation, the controller 102 may actuate the speaker 104 at a frequency of less than 30 Hz. At frequencies within this frequency range, the signal may not be audible to a user of the mobile device 1000. Furthermore, at this frequency range the excursion of the speaker 104 may be larger than at higher frequencies, which may improve the efficiency of the air pumping action of the speaker 104.

The controller 102 may be implemented in hardware, software, or a combination of hardware and software.

Figure 2:
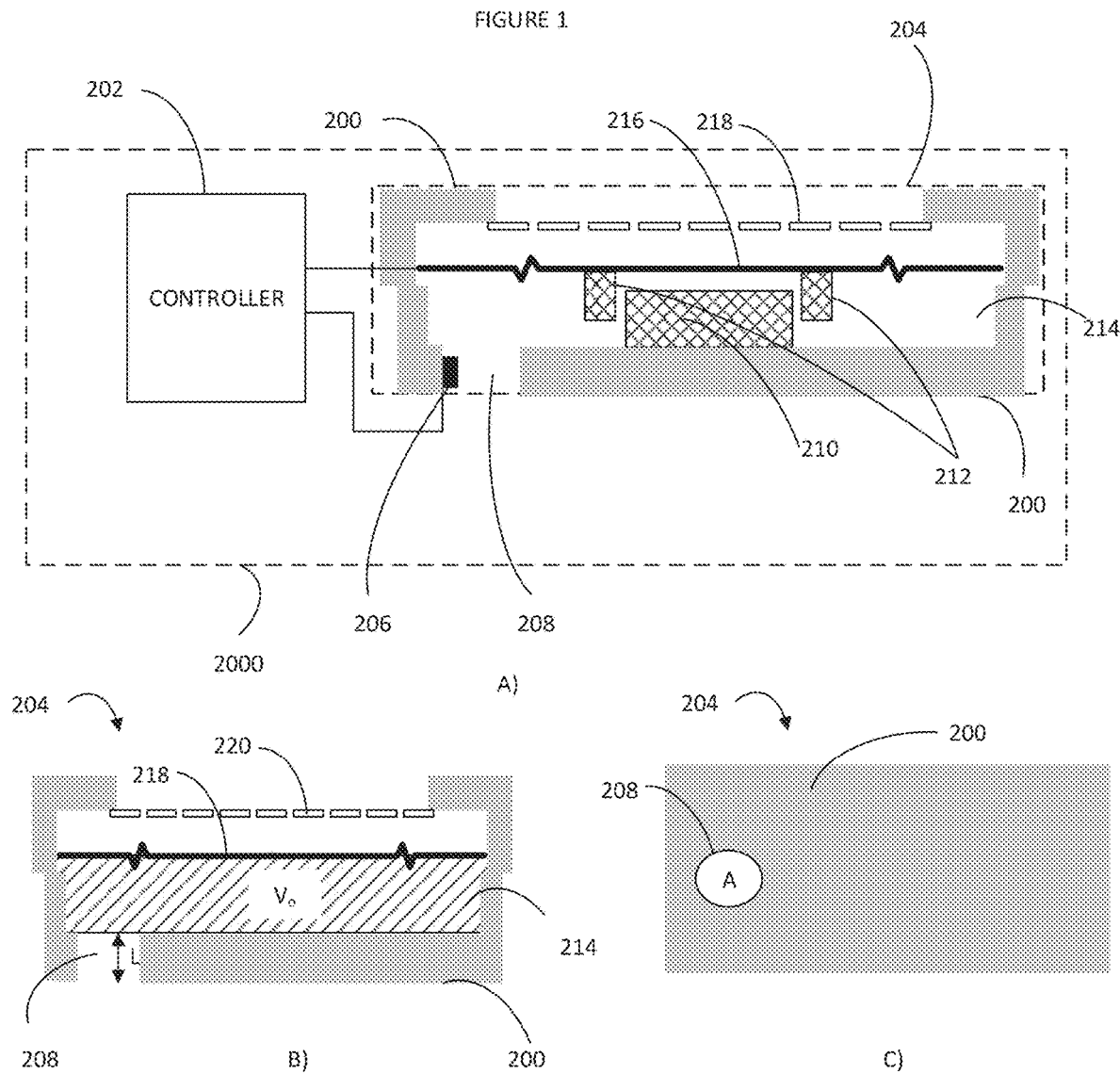
FIG. 2 illustrates a) a further mobile device with an environment sensor according to an embodiment b) the cross-section of a speaker of the further mobile device illustrating the back volume and c) a plan view of the speaker illustrating the cross-sectional area of an aperture to the back volume of the speaker.

FIG. 2A illustrates a further embodiment of a mobile device 2000. A speaker module 204 may have a speaker module housing 200. A speaker membrane 216 may be located within the speaker module housing 200. A speaker grille 218 may be located within an aperture of the housing 200 which may be considered the front of the speaker module 204.

The speaker membrane 216 may be connected to a coil 212. A magnet 210 may be located within a back volume 214. The skilled person will appreciate that the speaker membrane 216 may be activated by actuating the coil such that there is a varying magnetic coupling between the coil 212 and the magnet 210. The speaker membrane 216 and the speaker module housing 200 may define the back volume 214 which may be used to direct sound produced by the speaker membrane 216 towards the front of the speaker module 204, suppressing any anti-phase sound created at the back side of the membrane 216. A sensor 206 may be located in a vent hole or channel 208 which may be formed in the speaker module housing 200 adjacent to the back volume 214. The vent hole 208 may allow air out of the back volume 214 and so prevent static deformation of the speaker membrane 216 due to changes in the air pressure. The vent hole or channel 208 may be dimensioned so that at audible frequencies, there is no discernible effect on the audio characteristics of the speaker module 204. Typically the diameter of the vent hole 208 may be less than 0.5 mm. The vent hole 208 may directly connect the back volume 214 to the ambient air inside the mobile phone housing. The vent hole 208 may be connected to a further channel (not shown) outside the speaker membrane to directly vent the air from the back volume 214 through the housing or case (not shown) of the mobile device 2000.

A controller 202 may be connected to the sensor 206. The controller 202 may be connected to the coil 212. The controller 202 may be implemented in hardware, software, or a combination of hardware and software. The sensor 206 may be a gas sensor, such as a CO2 sensor, or a CO sensor. The sensor 206 may be a relative humidity sensor. The sensor 206 may be a temperature sensor.

In operation, when the mobile device 2000 is configured to perform a measuring or sensing operation, the controller 202 may apply a low frequency, which may for example be less than 30 Hz, to actuate the speaker membrane 216 during a measurement. The speaker module 204 may effectively act as an air pump that can quickly refresh air, containing moisture and any constituent gas which speeds up the response time of the sensor. If a non-audible frequency is used to actuate the speaker membrane 216, the user cannot hear the pumping action of the speaker module during the sensing operation. The controller 202 may receive a signal from the sensor 206 representative of an environmental parameter. The environmental parameter may be temperature, a relative humidity, CO2 concentration, CO concentration, volatile organic compounds (VOCs) concentration. The signal received from the sensor 206 may be processed by the controller 202 and converted into an environmental parameter value.

The dimensions of the vent channel 208 may be chosen such that the resonant frequency of the vent channel 208 is substantially the same, for example within 10%, of the frequency applied by the controller 202 during a sensing operation.

The resonant frequency of the vent channel 208 can be approximated as (assuming Helmholtz resonator):

$$f_0 = \frac{v_s}{2\pi}\sqrt{\frac{A}{V_0 L}} \quad (1)$$

in which $v_s$ is the speed of sound, A is the cross sectional area of the vent channel with reference to FIG. 2C which shows the speaker module 204 in plan view viewed from the back surface with aperture 208, L is the length of the vent channel with reference to FIG. 2B which shows speaker module 204 in cross-section, and $V_0$ is the volume of back volume 214, with reference to FIG. 2B which may be considered as the portion of the volume of the housing 200 enclosed behind the membrane 218. After a number of pumping cycles, the gas contents inside the back volume can be equalized to those in the ambient air.

The following calculation estimates how much time it takes to equalize gas contents inside a typical speaker. If the displacement volume of the membrane during each pumping cycle is v, the driving frequency is f, the back volume is $V_0$, the initial gas concentration inside the back volume is $C_0$, and gas concentration of ambient air is $C_A$, then at any moment, the changing speed of gas concentration C in the back volume can be expressed by the following differential equation:

$$\frac{\partial C(t)}{\partial t} = \frac{1}{V_0}[C_A - C(t)]vf \quad (2)$$

By solving this equation and taking into account boundary conditions, finally we have:

$$C(t) = C_A + (C_0 - C_A)e^{-\frac{fv}{V_0}t} \quad (3)$$

From equation (3), it can be seen that the time constant of the process is $V_0/(f*v)$ which represents how fast the air contents inside the back volume can be equalized to ambient air. As an example, using typical dimensions of a speaker used in smartphones: $V_0=1$ cm$^3$, v=0.03 cm$^3$, and assuming that the driving frequency is f=5 Hz (below audible range), then the time constant would be 6.7 seconds. This means that respectively it takes 6.7 s and 15.5 s for the concentration inside the back volume to reach 63.2% and 90% of its saturated value (or ambient concentration). In this formula it is assumed that after every pumping cycle, the gas contents can diffuse quickly so that the gas concentration just outside the hole is at any time equalized to the ambient concentration. This is in practice not accurate, and the time constant in reality may be longer than the estimate provided by the formula. However, the true time constant of the equalizing process is already much shorter than that of an inactive diffusion process in the conventional arrangement.

Figure 3:
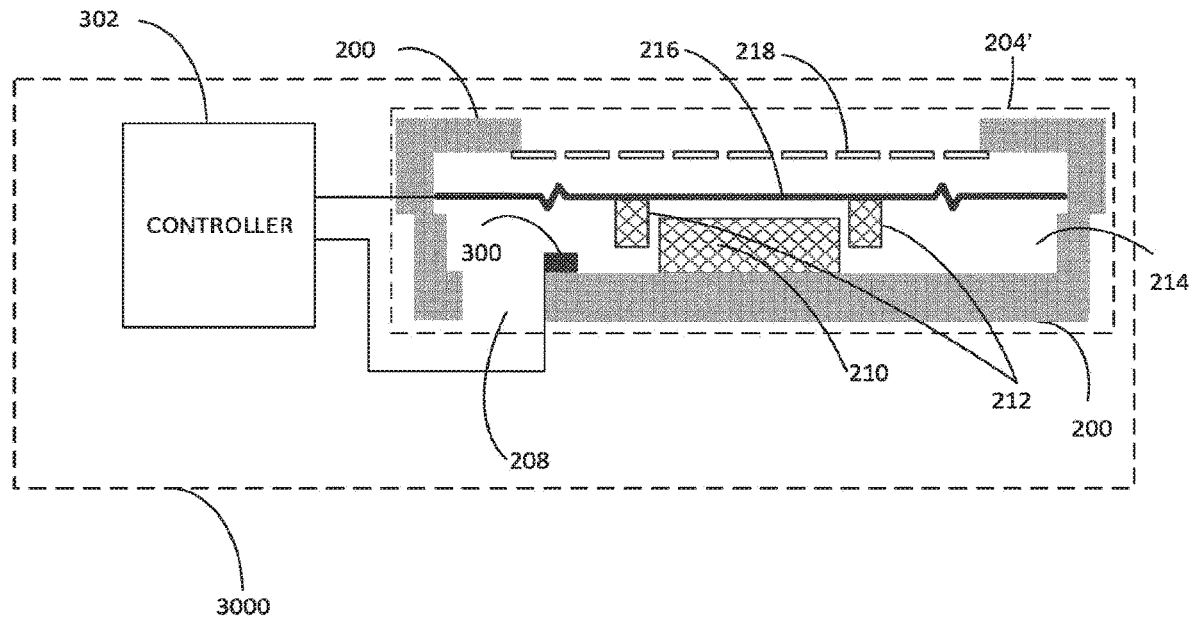
FIG. 3 shows a further mobile device with an environment sensor according to an embodiment.

FIG. 3 shows a mobile device 3000 having a controller 302 which may be connected to a sensor 300. The controller 302 may be connected to the coil 212 located within the speaker module 204'. The speaker module 204' has the same features as the speaker module 204. However in speaker module 204', the sensor 300 is located within the back volume 214 of the speaker module 204', rather than within the vent channel 208.

Figure 4:
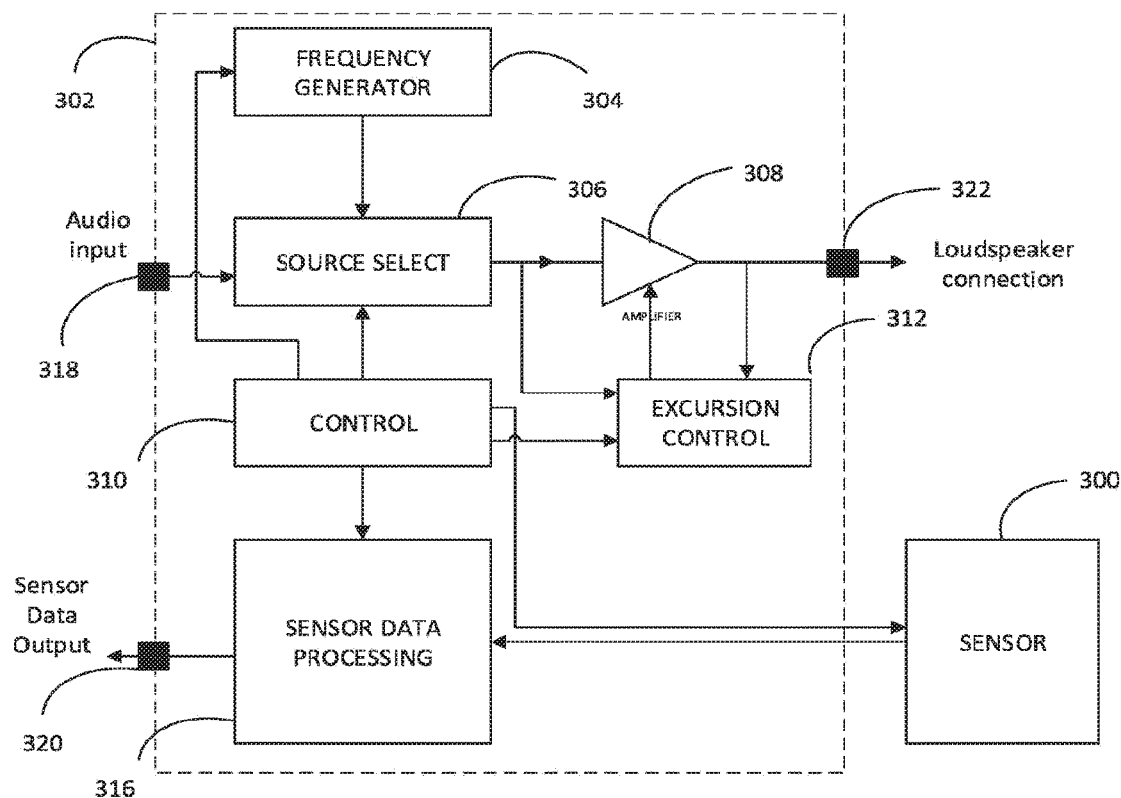
FIG. 4 illustrates the controller and sensor of the embodiment of FIG. 3.

FIG. 4 shows further details of the controller 302 and sensor 300 of the mobile device 3000. Frequency generator 304 may be connected to a source select 306. An audio input 318 may be connected to the source select 306. An output of the source select 306 may be connected to an input of an amplifier 308. The output of amplifier 308 may be connected to a terminal 322 for connection to speaker module 204'. The terminal 322 may also be connected to an input of excursion control module 312. An input of excursion control module 312 may be connected to the output of source select 306. An input of excursion control 312 may be connected to an output of the control module 310. An output of excursion control 312 may be connected to a gain control input of the amplifier 308. An output of control module 310 may be connected to a control input of the frequency generator 304. An output of control module 310 may be connected to an input of a sensor data processing module 316 and an output of control module 310 may be connected to a control input of the sensor 300. An output from the sensor 300 may be connected to an input of the sensor data processing module 316. Sensor data processing module 316 may have a sensor data output 320.

In operation of the mobile device 3000, the controller 302 may receive an audio signal from an audio source of the mobile device 3000 (not shown). The audio source may be routed to the amplifier 308 through the source select 306. The speaker membrane 216 within the speaker module 204' may be driven by the amplifier 308. In a sensing mode of operation the control module 310 may select a frequency from frequency generator 304. The selected generated frequency may be a constant frequency of a constant amplitude. The frequency generated by frequency generator 304 may be an inaudible low frequency, which may be typically less than 30 Hz. The frequency generator 304 may be a programmable frequency generator capable of generating different frequencies, for example between 0.1 Hz and 20 Hz, and different amplitudes. The skilled person will appreciate that the excursion control module 312 may limit the excursion of the speaker membrane 216 by adjusting the gain of the amplifier 308 in dependence of impedance measurements of the loudspeaker coil 212 and the amplitude and frequency of the reference signal. Following a predetermined period of time, a signal from the sensor 300 may be sampled by sensor data processing module 316. This sensor signal may be representative of an environmental parameter such as the concentration of a gas, temperature, or relative humidity. The sensor signal may be an analogue signal or a digital signal. The sensor data processing module 316 may process the signal and output a sensor data value on the sensor data output 320. The control module 310 may then disable the frequency generator 304 and the sensor 300. The control module 310 may then select the audio input 318 by controlling source select 306. The mobile device 3000 may then revert to output an audio source to the speaker module 204'. Alternatively the control module may mix the audio input 318 with the output of the frequency generator 304. Since the frequencies generated by the frequency generator 304 may be inaudible, then normal audio may be output by the speaker module 204' while the speaker membrane is actuated to increase the air flow across the sensor 300.

The controller 302 and the sensor 300 may be integrated in a single device. This may be for example a multi-chip module. Alternatively, for example a sensor such as a combined humidity and CO2 sensor may be integrated together with the controller as a single CMOS integrated circuit die. The controller 302 may be implemented in hardware, software, or a combination of hardware and software. For example the frequency generator module 304, the source select 306, the control 310, the sensor data processor 316, and the excursion control 312, may be implemented as software modules executed on a digital signal processor. The amplifier 308 may be implemented in hardware.

Figure 5:
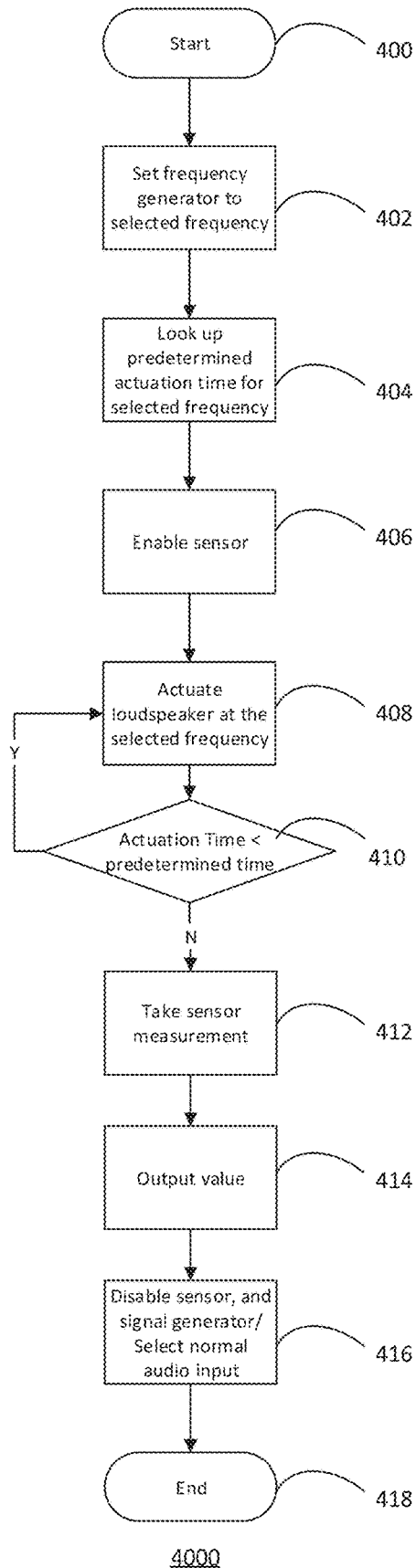
FIG. 5 illustrates a method of sensing and environmental parameter according to an embodiment.

FIG. 5 describes a method 4000 of operating a mobile device having an environmental sensor in order to sense an environmental parameter, such as ambient temperature, relative humidity, or the concentration of a gas. A mobile device may be in a sensing mode in step 400. The sensing mode may be triggered by, for example, a user requesting a sensing operation to start. In another example embodiment, the method may start periodically triggered by an internal timer of a mobile device. In step 402 the mobile device may select a frequency to drive a loudspeaker. The frequency may be audible or inaudible. In step 404, the method may look up a time constant for the selected inaudible frequency. In step 406 a sensor may be enabled. The sensor may be located in proximity to the loudspeaker in a mobile device. In step 408, the loudspeaker may be actuated at the frequency selected in step 402. In step 410, a check may be made to determine whether or not the time the speaker has been actuated is less than a predetermined time.

For mobile devices where the sensor is located in the back volume of a speaker module, the predetermined time may be related to the time constant as determined from equation 3. For example the predetermined time may be twice the time estimated for the concentration of the back volume to reach 90% of the saturated concentration. If the time for which the speaker has been actuated is less than the predetermined time, the method returns to step 408 and the actuation of the loudspeaker is continued. If the actuation time exceeds the predetermined time in step 410, the method moves to step 412 and the sensor output is sampled, and an environmental parameter is determined from the sensor signal. The environmental parameter value may be generated in step 414. In step 416 the sensor may be disabled and the actuation of the loudspeaker may stop. The method then finishes in step 418 and the mobile device may return to outputting normal audio via the loudspeaker.

In embodiments with other example sensing methods the mobile device may not use a predetermined time to actuate the loudspeaker. For example the mobile device may actuate a loudspeaker with an inaudible frequency and then take repeated samples of the output of the sensor until a steady state is achieved. This may correspond to the air or other gas in proximity with the environmental sensor being the same as the ambient conditions outside the mobile device.

Alternatively, the normal audio and the generated inaudible frequency may be combined to actuate the loudspeaker simultaneously. In this case a user of the mobile device may continue to listen to audio while the airflow is increased to the environmental sensor. The skilled person will appreciate that the generated signal may be adapted in amplitude and/or frequency to maximize the membrane excursion while being masked by the normal audio signal. The adaptation may depend on the resonant frequency of the vent channel. The generated frequency may be generated continuously so allowing regular actuation of the speaker membrane, sensing and software correction without stop criterion. Alternatively or in addition the sensor signal may be sampled continuously and then extrapolated to predict a final or steady-state concentration, for example by assuming the behaviour according to equation 3 and curve fitting to predict the ambient air gas concentration $C_A$.

Figure 6:
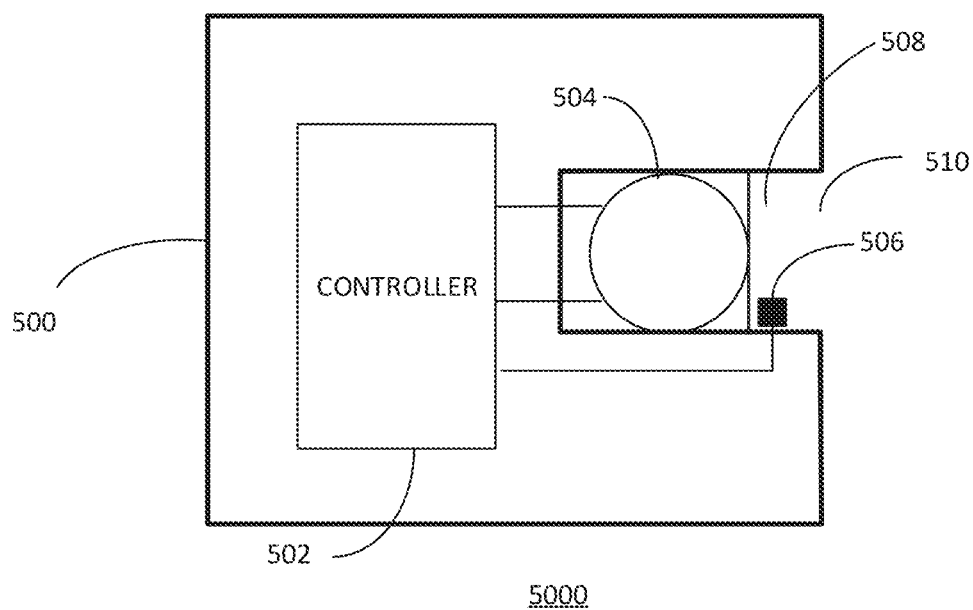
FIG. 6 shows a mobile device with an environment sensor according to an embodiment.

FIG. 6 illustrates a mobile device 5000. The controller 502 may have an output connected to a microphone 504 which may for example be a MEMS, electret, or dynamic microphone. The controller 502 and the speaker 504 may be enclosed in a housing 500. The housing 500 may be for example the case of the mobile device. The microphone 504 may be located in a microphone compartment 508 to detect an acoustic input through a microphone aperture 510 in the housing 500. An environmental sensor 506, which may be a humidity sensor, or a gas sensor, may be located in the microphone compartment 508. The environmental sensor 506 may be connected to the controller 502. In normal audio operation of the mobile device 5000, the controller 502 may receive an audio signal from the microphone 504. To determine an environmental parameter such as relative humidity, or the concentration of a gas such as carbon dioxide ($CO_2$), carbon monoxide (CO), or volatile organic compounds (VOC), the controller 502 may output a signal to the microphone at a low frequency which may be below the audible range.

The signal may actuate the microphone membrane or diaphragm (not shown) causing it to vibrate. The action of the microphone membrane may increase the airflow in the vicinity of the microphone, and so refresh the air in contact with the environmental sensor 506. The value of the environmental parameter to be measured may be detected by the environmental sensor 506. The controller 502 may convert a signal received from the environmental sensor 506, to a value representative of an environmental parameter.

The microphone compartment 508 may be connected to ambient air through a small channel and have a filter (not shown) in the air path to block dust entering the sensor. The long air path and filter may make it more difficult for moisture to diffuse in or out of the sensor location, and therefore the response time of the sensor becomes significantly longer than that of an open and stand-alone sensor. The actuation of the microphone 504 may reduce the time to equalize the concentration of gases, the humidity, and the temperature of the air in the microphone aperture 510 with the ambient air outside the mobile device. The mobile device 5000 may be able to reliably detect changes in the ambient environment with a reduced response time. MEMS microphones may be integrated with an environmental sensor such as a CMOS gas sensor in a single device. The device may be fabricated by a stack of two wafers bonded together or a combined MEMS microphone and gas sensor may be fabricated on a single wafer.

Alternatively or in addition a membrane in a pressure sensor if electrically actuated may vibrate. The vibration of the pressure sensor membrane may increase the air flow over an environmental sensor located in the vicinity of the pressure sensor. The membrane in a pressure sensor may be electrically activated by driving the pressure sensor in reverse, that is to say applying a voltage to actuate the membrane rather than detecting an electrical signal caused by a deflection of the membrane, which the skilled person will appreciate is the normal operation of the pressure sensor. MEMS pressure sensors may be integrated with an environmental sensor such as a CMOS gas sensor in a single device. The device may be fabricated by a stack of two wafers bonded together or a combined MEMS microphone and gas sensor may be fabricated on a single wafer. Although the appended claims are directed to particular combinations of features, it should be understood that the scope of the disclosure also includes any novel feature or any novel combination of features disclosed herein either explicitly or implicitly or any generalisation thereof, whether or not it relates to the same aspects as presently claimed in any claim and whether or not it mitigates any or all of the same technical problems.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A mobile device comprising:
a housing,
an electrically actuated membrane and an environmental sensor arranged at least partially within the housing, wherein the environmental sensor comprises at least one of a temperature sensor, a humidity sensor, or a gas sensor, and
a controller coupled to the electrically actuated membrane and the environmental sensor, wherein the environmental sensor is arranged to output a signal indicative of an environmental parameter, and the controller is operable to:
actuate the electrically actuated membrane to increase an airflow across a surface of the environmental sensor and to reduce a time to equalize a concentration of gases, a humidity, and a temperature of air in the housing with ambient air outside the mobile device, and
subsequent to actuating the electrically actuated membrane, determine a value of the environmental parameter based on the signal output by the environmental sensor,
wherein the environmental sensor is configured to be enabled in a sensing mode of the mobile device, and wherein:
the electrically actuated membrane is configured to be actuated during the sensing mode for a duration of a predetermined period of time.

2. The mobile device of claim 1, further comprising a loudspeaker, the loudspeaker comprising a speaker membrane, and wherein the electrically actuated membrane comprises the speaker membrane.

3. The mobile device according to claim 2, wherein the loudspeaker comprises a speaker module, the speaker module comprising a speaker module housing, wherein the speaker membrane is arranged within the speaker module housing and the environmental sensor is arranged at least partially within the speaker module housing.

4. The mobile device according to claim 1, wherein the speaker membrane and a portion of the housing define a back volume of the loudspeaker, and wherein the portion of the housing comprises a vent channel.

5. The mobile device of claim 4, wherein the environmental sensor is arranged at least partially within the back volume.

6. The mobile device of claim 4, wherein the environmental sensor is arranged at least partially within the vent channel.

7. The mobile device according to claim 4, wherein the vent channel and the loudspeaker back volume are dimensioned such that the resonant frequency of the vent channel is less than 30 Hz.

8. The mobile device according to claim 4, wherein the controller is configured to actuate the loudspeaker at a frequency within 10% of the resonant frequency of the vent channel.

9. The mobile device according to claim 1, further comprising a microphone arranged at least partially in the housing, the microphone comprising a microphone membrane and the electrically actuated membrane comprising the microphone membrane, and wherein the controller is operable either to receive a signal generated by the microphone in response to an acoustic input or to actuate the electrically actuated membrane to increase the airflow across a surface of the environmental sensor.

10. The mobile device according to claim 1, further comprising a pressure sensor arranged at least partially in the housing, the pressure sensor comprising a pressure sensor membrane and the electrically actuated membrane comprising the pressure sensor membrane, and wherein in a first mode of operation the controller is operable either to receive a signal generated by the pressure sensor in response to a change in air pressure or to actuate the electrically actuated membrane to increase the airflow across a surface of the environmental sensor.

11. The mobile device according to claim 1, wherein the controller is configured to actuate the electrically actuated membrane at an inaudible frequency.

12. The mobile device according to claim 1, further comprising an integrated circuit comprising the controller and the environmental sensor.

13. The mobile device according to claim 1, configured as one of a mobile phone, a personal digital assistant, a tablet computer, or an MP3 player.

14. The mobile device of claim 1, wherein the environmental sensor comprises at least one of the humidity sensor or the gas sensor.

15. A method for operating a mobile device, the method comprising:
entering, by the mobile device, a sensing mode,
selecting, by the mobile device, a frequency to drive a loudspeaker of the mobile device,
determining, by the mobile device, a time constant based on the selected frequency,
actuating, by the mobile device, the loudspeaker at the frequency selected for a duration of a predetermined period of time to increase an airflow across a surface of an environmental sensor in a housing of the mobile device and to reduce a time to equalize a concentration of gases, a humidity, and a temperature of air in a housing of the mobile device with ambient air outside the mobile device, and subsequent to actuating the loudspeaker, enabling, by the mobile device, the environmental sensor of the mobile device, wherein the environmental sensor comprises at least one of a temperature sensor, a humidity sensor, or a gas sensor.

16. The method according to claim 15, comprising:

determining, by the mobile device, whether a time for which the speaker has been actuated is less than the predetermined time, and, upon determining that the time for which the speaker has been actuated is less than the predetermined time, continuing actuation of the loudspeaker, or upon determining that the actuation time exceeds the predetermined time, sampling the sensor output by the environment sensor, and determining an environmental parameter based on the sensor output.

17. The method according to claim 15, comprising:

entering, by the mobile device, a normal audio mode, wherein in the normal audio mode, the mobile device actuates the loudspeaker according to the frequency selected and according to other audio simultaneously.

* * * * *